(No Model.)

H. P. WELLS.
CARRIAGE.

No. 499,768. Patented June 20, 1893.

Witnesses:
N. W. Green
L. W. Howe

Inventor:
Harlan P. Wells
per T. W. Porter
Atty.

UNITED STATES PATENT OFFICE.

HARLAN P. WELLS, OF AMESBURY, MASSACHUSETTS, ASSIGNOR OF ONE-HALF TO OSGOOD MORRILL, OF SAME PLACE.

CARRIAGE.

SPECIFICATION forming part of Letters Patent No. 499,768, dated June 20, 1893.

Application filed September 3, 1892. Serial No. 444,950. (No model.)

*To all whom it may concern:*

Be it known that I, HARLAN P. WELLS, of Amesbury, in the county of Essex and State of Massachusetts, have invented a new and useful Improvement in Carriages, which will, in connection with the accompanying drawings, be hereinafter fully described, and specifically defined in the appended claims.

Figure 1:
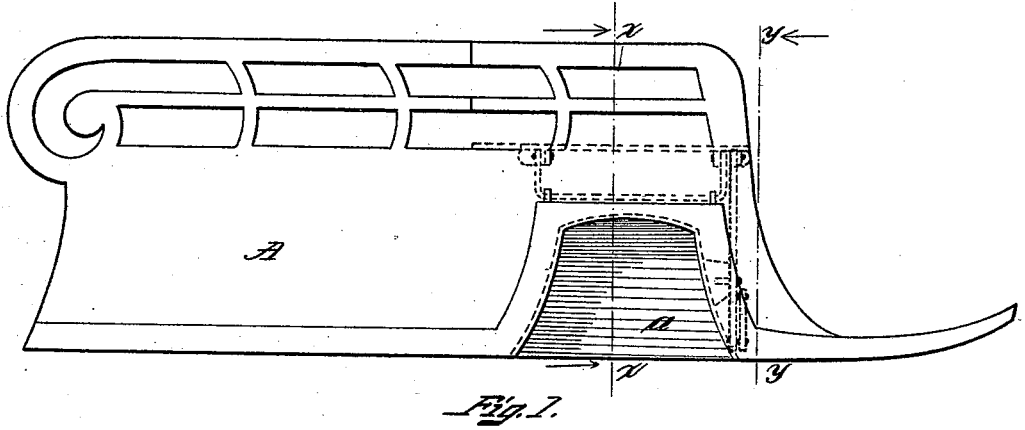
Figure 2:
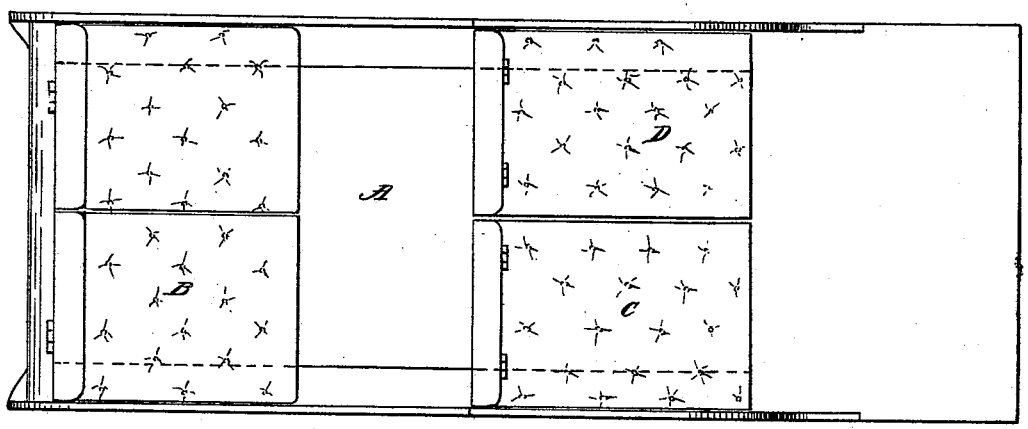
Figures 3, 4:
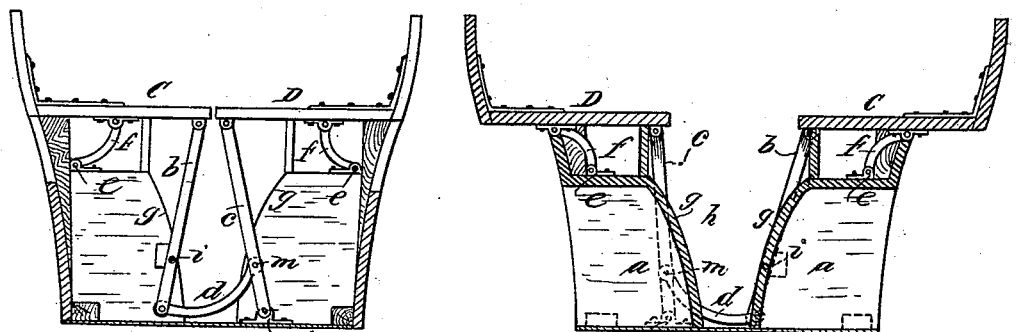

In said drawings, Figure 1 is a side elevation of a carriage embodying my invention. Fig. 2 is a top plan view of Fig. 1. Fig. 3 is a sectional elevation; the section being taken on line $y$, Fig. 1, and the view as from the right in that figure; and Fig. 4 is a sectional elevation, the section being taken on line $x$, Fig. 1, and the view as from the left in that figure.

The object of my invention is to produce a carriage having two or more seats, in which access to and egress from the rear, or any middle seat, may be effected by moving the halves of the front or rear seat sidewise of the body, so that a passage in the center of the body will give access to the interior of the body. And the invention will be next herein described and then specifically referred to in the claims.

In said drawings A represents the body, which may be of various styles; and B, B show the halves of the rear seat, shown in Fig. 2; and C, D represent the two halves of the front seat.

I have shown the invention as embodied in a cut under carriage, but it may be embraced in carriages that are not cut under, or it can be used for rear seats of any vehicle. The cut under is shown at $a$, $a$, that is, it extends inward on each side as far as the line $g$, thus leaving the space $h$ between the cut under spaces $a$ on each side.

To part C of the front seat I pivot the lever $b$, which is also pivoted to the front part of the cut under casing at $i$ and extends some distance below that point. To part D of the front seat I pivot lever $c$, which at its lower end is pivoted to the floor at $j$, and a link $d$ is connected with lever $b$ at its lower end (below its pivot $i$) and with lever $c$ at $m$ (above its lower pivot $j$), so that when either half C or D of the front seat is moved inward or outward the other half must move to an equal extent in an opposite direction. To regulate and control the movement of parts C, D, I journal in body A, just over the cut under, the irons $e$, which extend lengthwise of the body about the width of the front seat, and which at their respective ends are upturned as at $f$, and are there pivoted to the respective halves of the front seat. Hence it is that whether said halves of the seat are moved outward or inward their respective connections serve to hold them closely down to the body.

When it is desired that passengers enter or leave the rear seat, if the front seat is then occupied, all that is requisite is for the occupant to rise lightly from the front seat and at the same time to press outward, when the halves of the seat will be moved outward to the limit permitted, and after the occupants of the rear seat have passed through the opening in the front seat it is by the reverse movement brought together as before. If the front seat happen to be empty when it is to be thus operated, all that is necessary is to take hold of either half and press it outward, when it will be opened as above described; as the connection of levers $b$, $c$ and link $d$ insures a simultaneous movement of the two halves of the seat.

The respective parts already described, by which the halves C, D of the front seat may be moved inward and outward, can be with equal facility applied to rear seat B, B, or to said seat and to a seat in rear of it, if desired. All that would be requisite would be to arrange standards in the floor, to which the levers $b$, $c$, would be attached; and with irons $e$, $f$, as shown in the front seat, the rear seat or any intermediate seat could be just as readily opened and closed. Hence the passengers for the rear seat may enter from the rear of the body, in which case said devices need not be employed on the front seat. And if three seats were used, the front seat might be so constructed in order to reach the middle seat, while the rear seat would be entered from the rear; or all the seats could be so constructed, so as to be approached from front or rear.

It will be obvious that levers $b$ and $c$, with link $d$, may or may not be arranged on both the front and rear of seat C, D as may be found most desirable; and also that a front seat divided and arranged to move sidewise of the body, for access to and passage from the rear seat, is not in its nature confined to a cut under body, but may be employed in bodies where there is no cut under, and that other devices than those shown may be employed for the purpose of moving the seats outward and inward.

Having thus described my invention, what I claim as new, and desire to secure by Letters Patent, is—

1. In a carriage having two or more seats, a front seat divided in halves C, D, with the levers $b$, $c$, connected therewith and with the body, the link $d$ uniting levers $b$. $c$. and the irons $e$ pivoted to the body and respectively with halves C, D, so that said halves have a limited movement outward and inward, substantially as specified.

2. A carriage formed with a cut under $a, a$, upon each side thereof, and having a central space extending to the floor; the front seat divided transversely into halves C, D, and pivotally connected with the body so as to be moved laterally a limited distance to afford a passage through space $h$, substantially as specified.

HARLAN P. WELLS.

Witnesses:
T. W. PORTER,
L. W. HOOVER.